United States Patent
Moschetti

(10) Patent No.: US 7,299,840 B1
(45) Date of Patent: Nov. 27, 2007

(54) DIRECTIONAL FEATHERBOARD

(76) Inventor: Mitchell R. Moschetti, 251 Cardinal Rd., Fletcher, NC (US) 28732

( * ) Notice: Subject to any disclaimer, the term of this patent is extended or adjusted under 35 U.S.C. 154(b) by 0 days.

(21) Appl. No.: 11/545,897

(22) Filed: Oct. 10, 2006

(51) Int. Cl.
 *B27B 31/00* (2006.01)
(52) U.S. Cl. .................. 144/253.6; 144/286.1
(58) Field of Classification Search ............ 144/251.5, 144/286.5, 287, 253.1, 253.4, 253.5, 253.6, 144/253.9; 83/438, 440, 440.1, 440.2, 442, 83/444, 446–45, 477.2
See application file for complete search history.

(56) References Cited

U.S. PATENT DOCUMENTS

| 4,476,757 | A | * | 10/1984 | Morris ................. | 83/446 |
|---|---|---|---|---|---|
| 4,842,031 | A | | 6/1989 | Peek | |
| 5,000,237 | A | | 3/1991 | Berkeley et al. | |
| 5,058,474 | A | * | 10/1991 | Herrera ................ | 83/447 |
| 5,546,670 | A | | 8/1996 | Chiang | |
| 6,718,857 | B2 | | 4/2004 | Kimmel et al. | |
| 6,968,766 | B2 | | 11/2005 | Kimmel et al. | |
| 7,017,464 | B2 | | 3/2006 | Coderre | |
| 7,140,286 | B2 | * | 11/2006 | Schwartz ............... | 83/446 |
| 2002/0162439 | A1 | | 11/2002 | Fontaine | |
| 2003/0140754 | A1 | | 7/2003 | Kimmel et al. | |
| 2004/0250892 | A1 | | 12/2004 | Fontaine | |
| 2004/0250902 | A1 | | 12/2004 | Kimmel et al. | |
| 2005/0241450 | A1 | | 11/2005 | Schwartz | |

FOREIGN PATENT DOCUMENTS

WO    WO 92/00172 A1    1/1992
WO    WO 2005/014247 A2    2/2005

OTHER PUBLICATIONS

Bench Dog Tools web page, "Feather-Loc®," www.benchdog.com/singlefeatherloc.htm, effective date unknown.
Bench Dog Tools web page, "Feather-Loc®," www.benchdog.com/featherloc.htm, effective date unknown.
Micro-Mark® web page, "Instructions for #80890 Featherboard Set," www.micromark.com/html_pages/instructions/80898i/featherboard.html, effective date unknown.
Woodworker's Supply web pages, "Featherboards Help Control Stock of Almost Any Height and Width," woodworker.com/cgi-bin/FULLPRES.exe?PARTNUM=47340&LARGEVIEW=ON, effective date unknown.

* cited by examiner

*Primary Examiner*—Shelley M. Self
(74) *Attorney, Agent, or Firm*—Carter & Schnedler, P.A.

(57) ABSTRACT

A featherboard for use with a cutting machine, such as a table saw, having a table which supports a workpiece, and a fence extending upwardly from the table. A row of flexible fingers lie in respective parallel finger planes and have distal ends for engaging the workpiece. The distal ends generally lie in an engagement plane which is parallel to a featherboard engagement surface of the workpiece, and each of the flexible fingers is capable of flexing in a flex direction perpendicular to its respective finger plane. In a compound angle configuration, the finger planes intersect the engagement plane at a pair of angles so that, during use, a single featherboard provides forces which urge the workpiece both against the fence and against the table as the workpiece is pushed along the fence in a workpiece travel direction. A parallel setting gauge may be included.

20 Claims, 9 Drawing Sheets

DIRECTIONAL FEATHERBOARD

BACKGROUND OF THE INVENTION

The invention relates generally to workpiece motion guides and, more particularly, to featherboards.

Many cutting machines, in particular woodworking machines, have a table which supports a workpiece, and a fence extending upwardly from the table. The workpiece is held against and pushed along the fence past a cutting tool, such as a saw blade. Typically, motion of the workpiece is imparted in whole or in part by hand.

For guiding the motion of the workpiece, such as a piece of wood, as the workpiece is fed into the cutter of a cutting machine such as a table saw, band saw, router table or shaper, a variety of motion guides are known in the art. Common motion guides include various spring-loaded hold downs, as well as featherboards.

Such motion control can include imparting a force which urges the workpiece down against the table, and imparting another force which urges the workpiece horizontally against the fence, independently of manual guiding or pushing of the workpiece. Motion guides also serve the function of minimizing the effect of kickback, which can occur when the workpiece binds to the blade of a table saw.

Prior art featherboards include a plurality of diagonally angled flexible fingers, or "feathers" that, depending upon the mounting orientation of the featherboard, urge the workpiece either tightly against the fence in the case of a featherboard oriented horizontally and mounted to the table, or tightly against the table top in the case of a featherboard oriented vertically and mounted to the fence. A plurality of featherboards, at least one mounted to the fence and oriented vertically and at least one mounted to the table and oriented horizontally, may be employed in combination so as to urge a workpiece both against the table and against the fence.

SUMMARY OF THE INVENTION

In one aspect a featherboard is provided for use with a cutting machine having a table which supports a workpiece and a fence extending upwardly from the table. The featherboard serves to urge the workpiece both against the fence and against the table as the workpiece is pushed along the fence in a workpiece travel direction. The featherboard includes a mounting portion and a row of flexible fingers extending from the mounting portion. The flexible fingers lie in respective parallel finger planes and have distal ends for engaging the workpiece. The distal ends generally lie in an engagement plane which, during use, is parallel to a featherboard engagement surface of the workpiece, and each of the flexible fingers is capable of flexing in a flex direction perpendicular to its respective finger plane. The finger planes intersect the engagement plane at a first angle so that, during use, resiliency of the flexible fingers provides a static force which urges the workpiece downwardly against the table when said featherboard is oriented vertically or sideways against the fence when said featherboard is oriented horizontally. Further, in a compound angle configuration, the finger planes also intersect the engagement plane at a second angle such that the flex directions of the flexible fingers are angled with reference to the workpiece travel direction so that, during use, a frictional force is developed which urges the workpiece sideways against the fence when said featherboard is oriented vertically or downwardly against the table when said featherboard is oriented horizontally.

In another aspect a featherboard is provided for use with a cutting machine having a table which supports a workpiece and a fence extending upwardly from the table. The featherboard has a rear side, which, during use, is against the fence when said featherboard is oriented vertically or against the table when said featherboard is oriented horizontally, and a spaced apart front side which, during use, is generally visible. The featherboard serves to urge the workpiece at least against the table when said featherboard is oriented vertically or against the fence when said featherboard is oriented horizontally as the workpiece is pushed along the fence in a workpiece travel direction. The featherboard includes a mounting portion and a row of flexible fingers extending from the mounting portion. The flexible fingers lie in respective parallel finger planes and have distal ends for engaging the workpiece. The flexible fingers extend widthwise between the front and rear sides, and the distal ends generally lie in an engagement plane which, during use, is parallel to a featherboard engagement surface of the workpiece. Each of the flexible fingers is capable of flexing in a flex direction perpendicular to its respective finger plane, the finger planes intersecting the engagement plane at an angle so that, during use, resiliency of the flexible fingers provides a static force which urges the workpiece downwardly against the table when said featherboard is oriented vertically or sideways against the fence when said featherboard is oriented horizontally. A parallel setting gauge facilitates adjustment of the featherboard such that, when the workpiece is not engaged and the fingers are undeflected, the distal ends lie in a finger end plane which is parallel to the table when said featherboard is oriented vertically or parallel to the fence when said featherboard is oriented horizontally, and which finger end plane is spaced a desired distance from the table or the fence so that each finger is flexed by a desired amount as the workpiece is fed into full engagement with the flexible fingers. The parallel setting gauge takes the form of a rabbet formed in the distal end of each of the flexible fingers adjacent the front side for engagement with the workpiece while the featherboard mounting is adjusted with the fingers undeflected. The rabbets have a depth such that, following adjustment, when the workpiece is fed into engagement with the full width of the fingers during use the desired amount of finger flexing occurs.

In yet another aspect a featherboard is provided for use with a cutting machine having a table which supports a workpiece and a fence extending upwardly from the table. The featherboard serves to urge the workpiece at least against the fence when said featherboard is oriented vertically or against the table when said featherboard is oriented horizontally as the workpiece is pushed along the fence in a workpiece travel direction. The featherboard includes a mounting portion and a row of flexible fingers extending from the mounting portion. The flexible fingers lie in respective parallel finger planes and have distal ends for engaging the workpiece. The distal ends generally lie in an engagement plane which, during use, is parallel to a featherboard engagement surface of the workpiece. Each of the flexible fingers is capable of flexing in a flex direction perpendicular to its respective finger plane, the finger planes intersecting the engagement plane at an angle so that, during use, resiliency of the flexible fingers provides a static force which urges the workpiece downwardly against the table when said featherboard is oriented vertically or sideways against the fence when said featherboard is oriented horizontally. The distal ends of the flexible fingers are beveled such that, when deflected, a flat end surface of each finger engages the workpiece.

DETAILED DESCRIPTION

Figure 1:
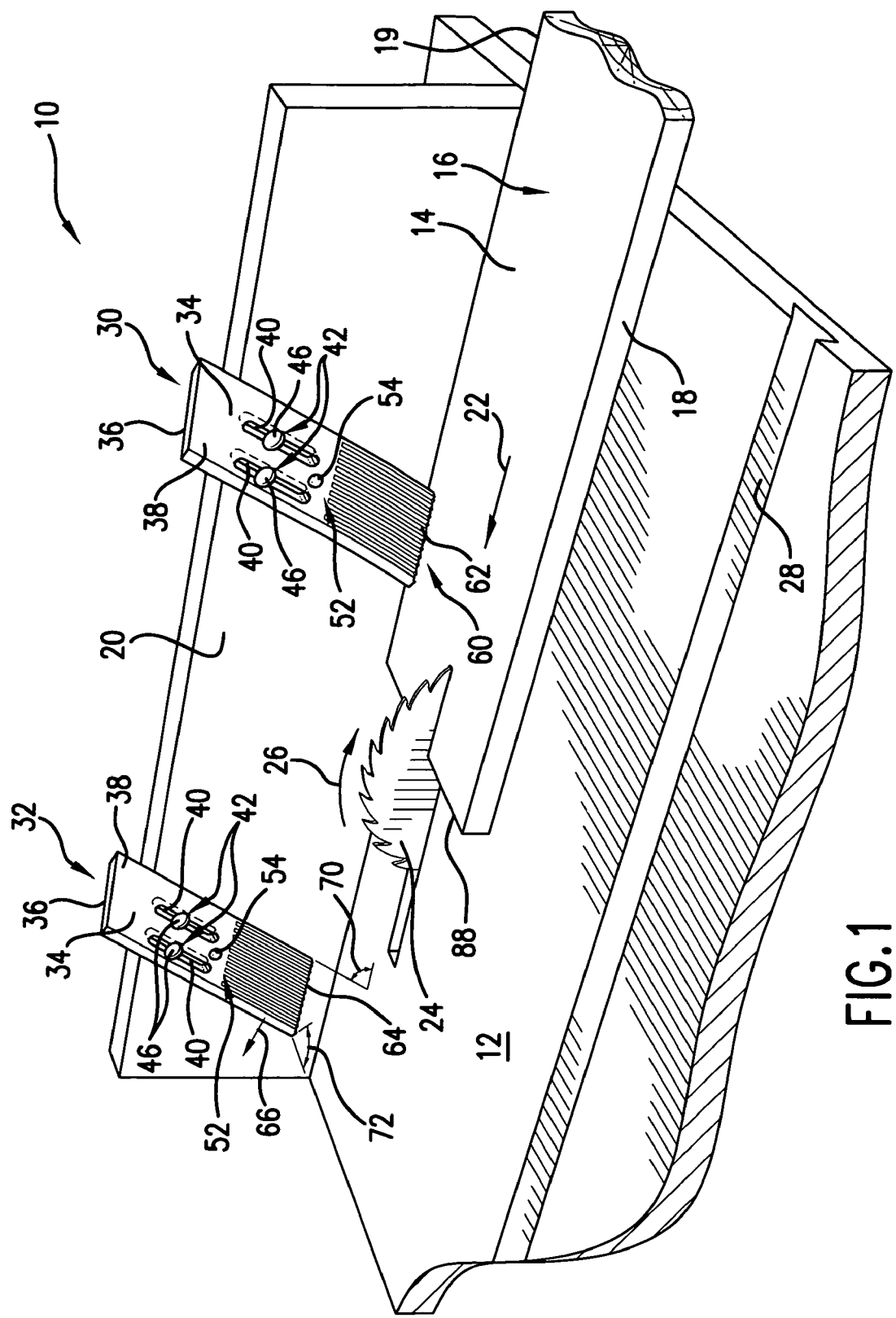
FIG. 1 is a three-dimensional view of a cutting machine in the exemplary form of a table saw, generally from the left front of the table saw, with "right hand" versions of two featherboards embodying the invention mounted to the fence of the table saw in a vertical orientation.
Figure 2:
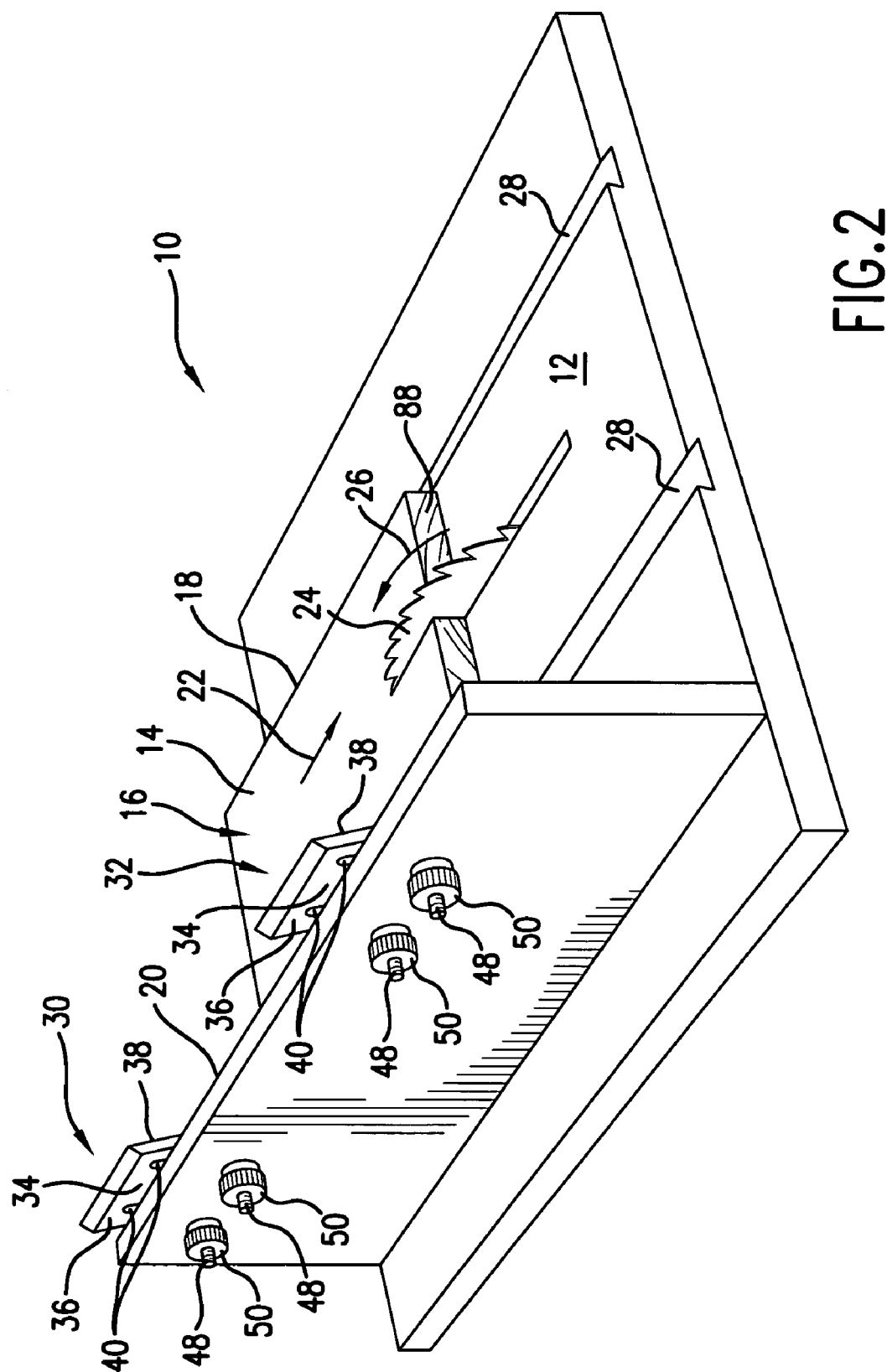
FIG. 2 is a three-dimensional view of the table saw and featherboards of FIG. 1, generally from the right rear of the table saw opposite the orientation of FIG. 1, depicting attachment of the featherboards to the fence of the table saw.

Referring first to FIGS. 1 and 2, a cutting machine 10 in the exemplary form of a table saw 10 includes a horizontal table 12 which supports a workpiece 14 having a top surface 16, a visible side surface 18, and a guiding side surface 19, as well as a fence 20 extending upwardly from the table 12. FIG. 1 is a three-dimensional view of the table saw 10 generally from the left front thereof, and FIG. 2 is a three-dimensional view of the table saw 10 generally from the right rear thereof, opposite the orientation of FIG. 1. During operation, the workpiece 14 is pushed, typically manually, in a workpiece travel direction indicated by an arrow 22 along the fence 20 into or past a cutter 24, in the representative form of a circular saw blade 24 rotating in a direction as indicated by arrow 26. The guiding side surface 19 of the workpiece 14 accordingly engages the fence 20. FIGS. 1 and 2 represent a common configuration of a table saw 10, wherein the fence 20 is to the right of the saw blade 24, when viewed from the front of the table saw 10, in the direction of workpiece 14 travel.

The table saw 10 of FIGS. 1 and 2 includes a set of miter gauge guide slots 28 formed in the table 12, and oriented parallel to the fence 20 intended for the purpose of guiding a conventional miter gauge (not shown) for crosscutting. The particular miter gauge guide slots 28 illustrated have a dovetail cross section. Other commonly-employed miter gauge guide slots are rectangular slots, and inverted "T" slots.

Mounted to the fence 20 of the table saw 10 in a vertical orientation are a pair of featherboards 30 and 32 embodying the invention. Each of the featherboards 30 and 32 has a mounting portion 34, adapted to be secured either against the fence 20 as shown in FIGS. 1 and 2, or against the table 12, as is described hereinbelow with reference to FIG. 8. Each of the featherboards 30 and 32 has a rear side 36 which, during use, is either against the fence 20 or against the table 12, depending upon whether the featherboard 30 or 32 is oriented vertically or horizontally, and a spaced-apart front side 38 which, during use, is generally visible. The mounting portion 34 includes a pair of longitudinal mounting and adjustment slots 40 through which a pair of fasteners 42 pass. Corresponding circular apertures 44 are provided in the fence 20 (visible in FIG. 8). In the illustrated embodiment, the fasteners 42 take the form of carriage bolts 42 having rounded heads 46, and threaded ends 48, with hand-tightenable nuts 50 on the threaded ends 48 (FIG. 2), which extend through the fence 20. During typical set-up adjustment, each featherboard 30 and 32 is in turn grasped in a user's left hand, while the nuts 50 are manipulated with the right hand. The featherboards 30 and 32 may be made of any suitable material, such as wood, or injection-molded plastic.

Figure 3:
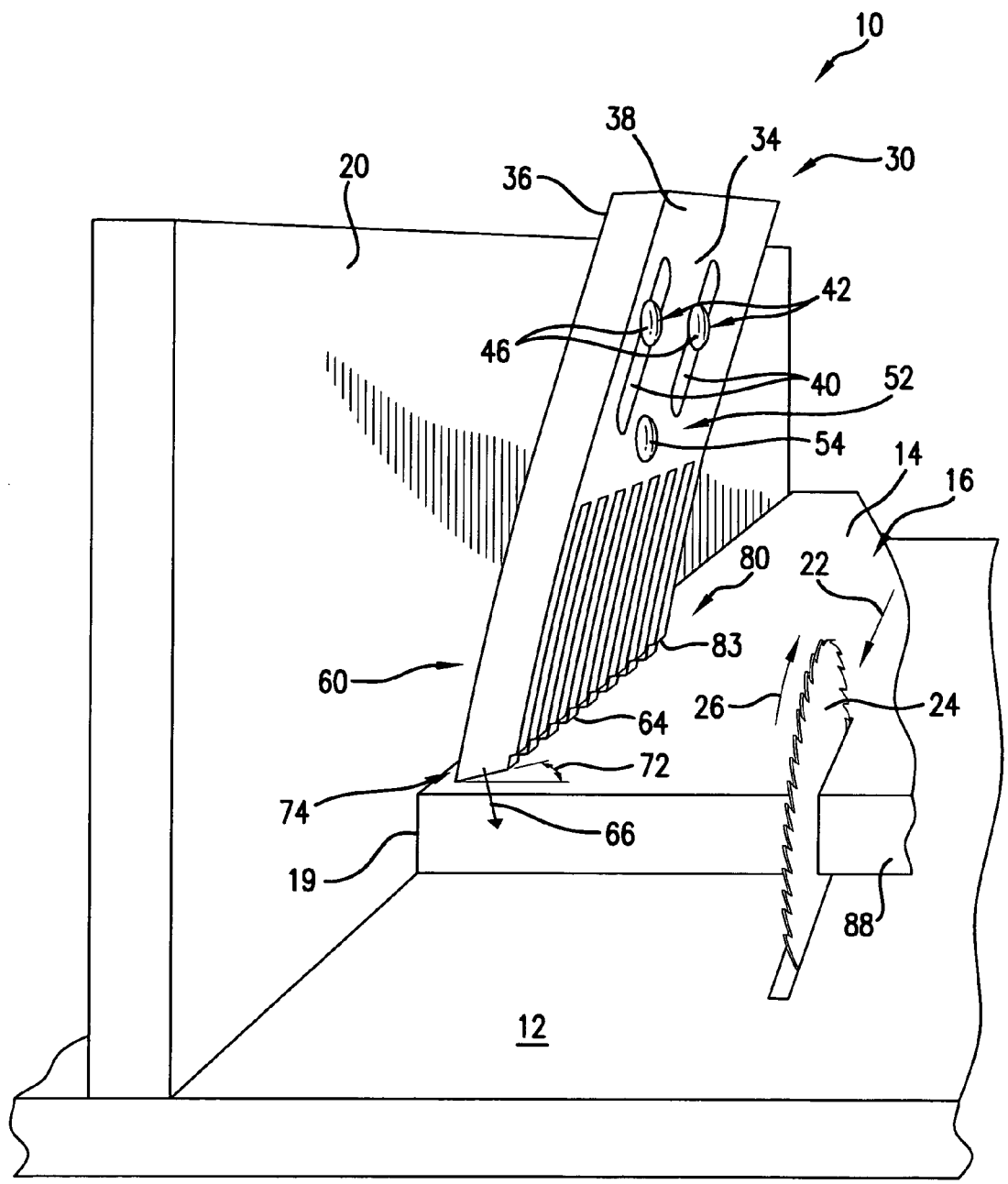
FIG. 3 is an enlarged three-dimensional view of the table saw and one of the featherboards of FIG. 1, generally from the left rear of the table saw, depicting the manner in which the featherboard fingers deflect away from the fence to provide a force which urges the workpiece against the fence as the workpiece is pushed along the fence.

As is described in greater detail hereinbelow, particularly with reference to FIG. 3, featherboards embodying the invention have directional characteristics, and may be provided in what are herein termed "right hand" and "left hand" versions. The featherboards 30 and 32 are "right hand" version featherboards. "Left hand" version featherboards are described hereinbelow with reference to FIGS. 7 and 8. In view of the directional characteristics of the featherboards 30 and 32, on the visible front side 38 of each featherboard 30 and 32 is a protrusion, generally designated 52, to prevent or at least discourage improper mounting of the featherboard 30 or 32 (with the normally visible front side 32 against either the fence 20 or the table 12). In the embodiment of FIG. 3, the protrusion 52 which prevents or at least discourages improper mounting is a simple rounded protuberance 54. In the case of a featherboard 30 or 32 made of wood, the rounded protuberance 54 can be the head of a very short carriage bolt glued into a hole (not shown). More elaborately, the short bolt can terminate in a nut that is contained within a recess countersunk from the rear side 36. In the case of a featherboard 30 or 32 made of molded plastic, the rounded protuberance 54 comprising the protrusion 52 is simply part of the molded piece.

Each of the featherboards 30 and 32 includes a row 60 of flexible fingers 62 extending from the mounting portion 34. The flexible fingers 62 extend widthwise between the front 38 and rear 36 sides, and lie in respective parallel finger planes defined by the fingers 62. The flexible fingers 62 have distal ends 64 for engaging the workpiece 14. The distal ends 64 lie generally in an engagement plane defined by the distal ends 64. The engagement plane, during use, is parallel to a featherboard engagement surface of the workpiece 14. In the arrangement of FIGS. 1 and 2, the featherboard engagement surface is the top surface 16 of the workpiece 14. (In the arrangement of FIG. 8, described hereinbelow, the featherboard engagement surface is the visible side surface 18 of the workpiece 14.) Each of the flexible fingers 62 is capable of flexing in a flex direction perpendicular to its respective finger plane. Arrow 66 represents the flex direction of one of the fingers 62 of the featherboard 32.

The finger planes intersect the engagement plane at a first angle 70 so that, during use, resiliency of the flexible fingers 62 provides a static force which urges the workpiece 14 downwardly against the table 12, when the featherboards 30 and 32 are mounted to the fence 20 and oriented vertically as in FIGS. 1 and 2. (When a featherboard is mounted to the table 12 and oriented horizontally, as in FIG. 8, resiliency of the flexible fingers 62 provides a static force which urges the workpiece 14 sideways against the fence 20.) The terminology "static force" is intended herein to mean that the workpiece 14 is urged either downwardly against the table 12 or sideways against the fence 20, depending upon the orientation of the featherboard 30 or 32, regardless of whether the workpiece 14 is in motion. This first angle, which may be viewed as a diagonal angle, is comparable to and provides essentially the same effect as in a conventional prior art featherboard.

Referring now to FIG. 3, in addition to FIGS. 1 and 2, in a compound angle configuration, the finger planes defined by the fingers 62 also intersect the engagement plane defined by the distal ends 64 at a second angle 72 such that the flex directions of the flexible fingers 62, as indicated by the arrow 66, are angled with reference to the workpiece travel direction 18. As best seen in FIG. 3, the fingers 62 flex in a manner such that, during use when the workpiece 14 is in motion, the distal ends 64 engaging the top surface 16 of the workpiece 14 cause a frictional or traction force to be developed which, in the orientation of FIGS. 1-3, includes a component which urges the workpiece 14 sideways against the fence 20. Accordingly, the guiding side surface 19 of the workpiece 14 is more reliably maintained in engagement with the fence 20. Significantly, this frictional or traction force component which urges the workpiece 14 sideways against the fence 20 during use when the workpiece 14 is in motion does not require an element pushing against the side surface 18 of the workpiece 14. (In the horizontal orientation of FIG. 8, described hereinbelow, this frictional or traction force urges the workpiece 14 downwardly against the table 12, and does not require an element pushing against the top surface 16 of the workpiece 14.)

As best seen in FIG. 3, the distal ends 64 of the fingers 62 are accordingly spaced away from the fence 20, forming a gap 74. This gap 74 results due to the compound angle configuration and, in particular, in view of the second angle 72. It will be appreciated that the gap 74 does not exist when the fingers 62 are undeflected, that is, prior to engagement with the workpiece 14. In conventional prior art featherboards, no such gap 74 is developed except, perhaps, incidentally due to slight misalignments.

Figure 4:
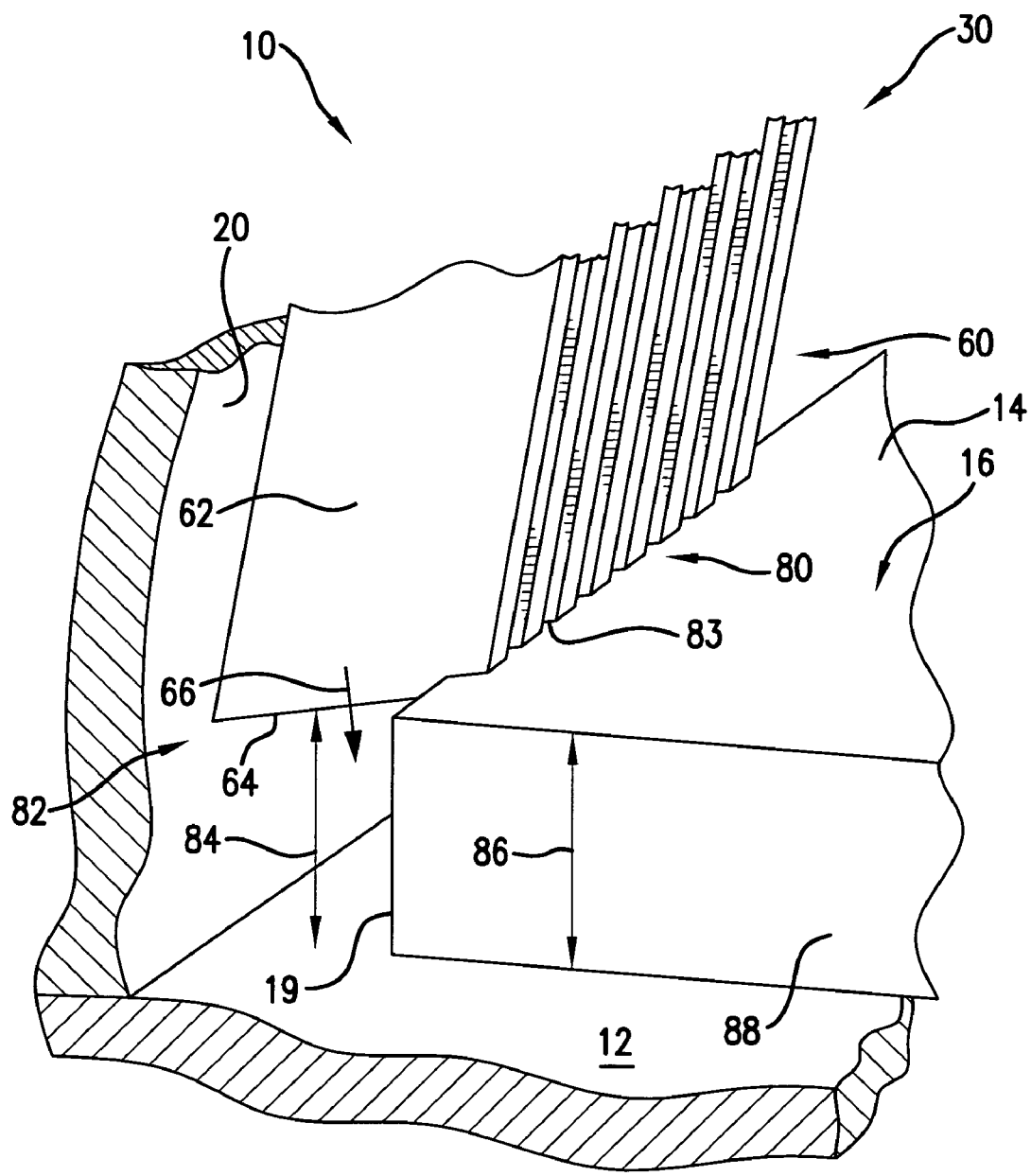
FIG. 4 is a further enlarged three-dimensional view in the same orientation as FIG. 3, showing a parallel setting gauge in the form of a setting gauge rabbet in use.
Figure 5:
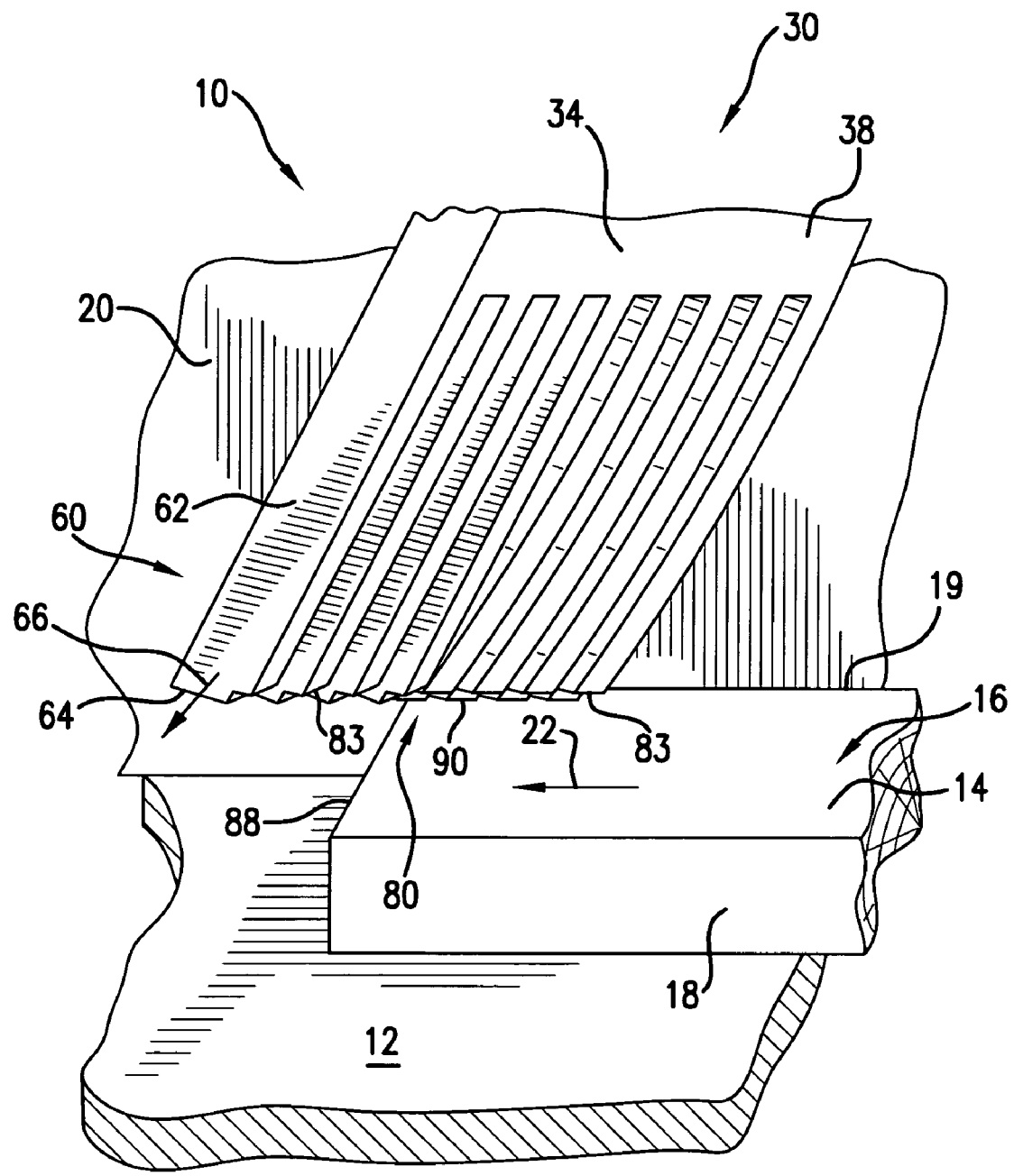
FIG. 5 is an enlarged three-dimensional view, generally from the left side of the table saw, depicting the deflection of the featherboard fingers as the workpiece is being fed, and additionally showing how the tips of the fingers are beveled, such that, when deflected, a flat end surface of each finger engages the workpiece.
Figure 7:
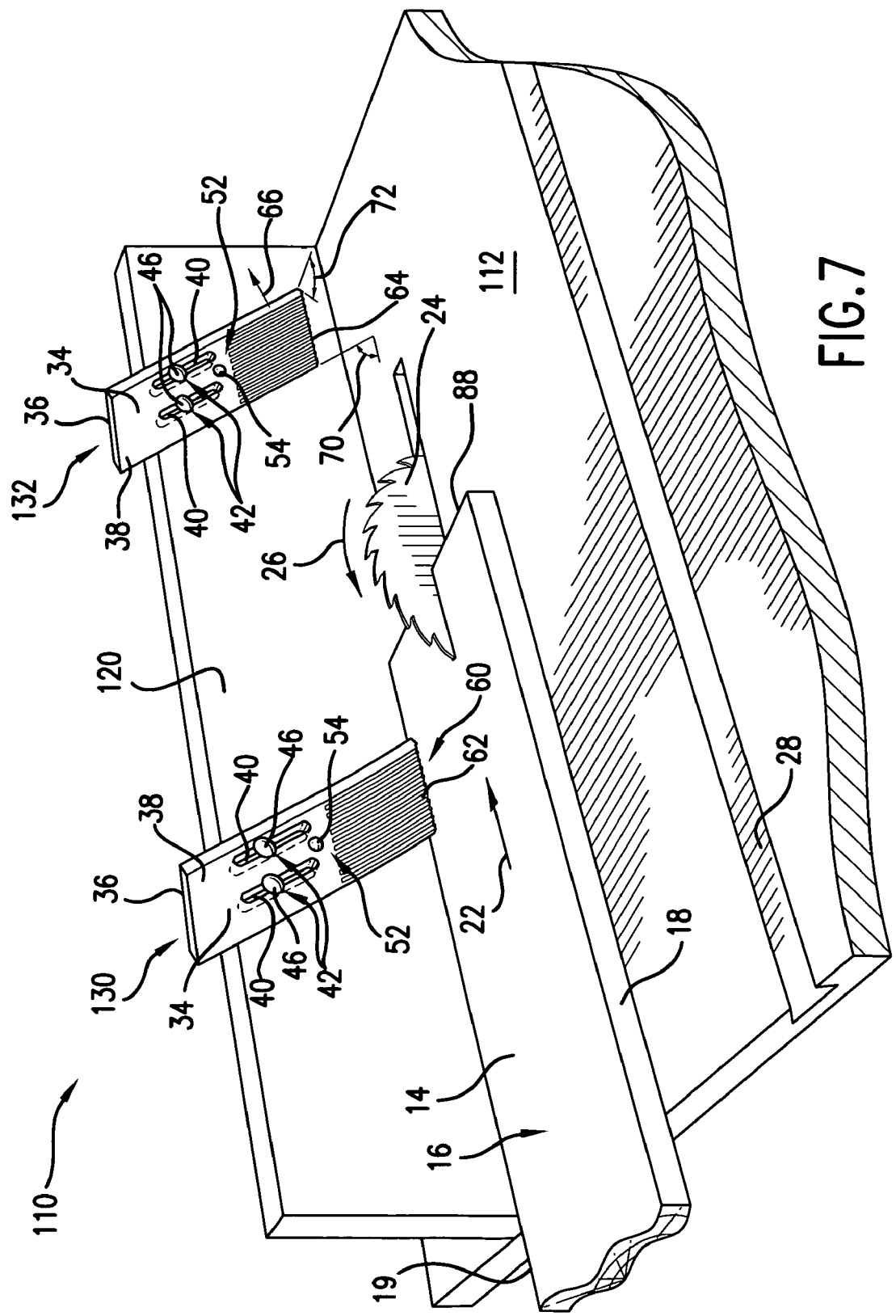
FIG. 7 is a mirror image of FIG. 1, and is a three-dimensional view, generally from the right front of the table saw, with "left hand" versions of two featherboards embodying the invention mounted to the fence of the table saw in a vertical orientation.

FIG. 4 is a further enlarged three-dimensional view in the same orientation as FIG. 3, that is, generally from the left rear of the table saw 10. FIG. 5 is a view generally from the left side of the table saw 10. In order to facilitate adjustment of the featherboard 30 or 32 for a predetermined desired tension, with the ends 64 of the fingers 62 all parallel to the table 12, a parallel setting gauge, generally designated 80, is provided. More particularly, the parallel setting gauge 80 facilitates adjustment of the featherboard 30 or 32 such that, when the workpiece 14 is not engaged with the featherboard 30 or 32 and the fingers 62 are undeflected, the distal ends 64 lie in an undeflected finger end plane 82 which is either parallel to the table 12 when the featherboard 30 or 32 is oriented vertically as in FIGS. 1-4, or parallel to the fence 20 when a featherboard is oriented horizontally as shown in FIG. 7. The finger end plane 82 is spaced a predetermined distance from the table 12 (or from the fence 20) so that each finger 62 is flexed by a desired amount (FIG. 5) as the workpiece 14 is fed into full engagement with each of the flexible fingers 62 in turn. In FIG. 4, this distance of the distal ends 64 of the fingers 62 from the table 12 when the fingers 62 are undeflected is referenced as distance 84. The undeflected distance 84 is less than the thickness 86 of the workpiece 14.

In the embodiment of FIG. 4, the parallel setting gauge 80 more particularly takes the form of a rabbet 83 formed in the distal end 64 of each of the flexible fingers 62 adjacent the visible front side 38. During a set up procedure prior to cutting, and as shown in FIG. 4, the setting gauge rabbet 83 is engaged with the workpiece 14 with the flexible fingers 62 undeflected, while the positions of the featherboards 30 and 32 are adjusted, employing the hand-tightenable nuts 50 (FIG. 2). During set-up adjustment as represented in FIG. 4, the FIG. 3 gap 74 does not exist because the fingers 62 are not flexed. It will be appreciated that, during set-up adjustment, the cutter 24 is not operating. Thus, in the case of a table saw, typically the circular saw blade 24 is retracted below the surface of the table 12 permitting adjustment, in particular, of the rear-most featherboard 32. As an alternative, a small scrap or offcut the same thickness as the workpiece 14 can be used to adjust the featherboards 30 and 32, without having to retract the saw blade 24. The depth of the rabbets 83 is such that, following set-up adjustment, when the cutter 24 is operating and the workpiece 14 is subsequently fed into engagement with the full width of the fingers 62 (FIG. 5), the desired amount of finger 62 flexing occurs.

In FIG. 5, motion of the workpiece 14 is indicated by the workpiece travel direction arrow 22, which defines a leading end 88 of the workpiece 14. As the leading end 88 engages each of the fingers 62 in turn, the fingers are deflected. In FIG. 5, the fingers 62 to the right of the workpiece leading edge 88 are deflected, while the fingers 62 to the left of the leading end 88 of the workpiece are not yet deflected.

It will be appreciated that the setting gauge 80 may as well be employed in combination with featherboards which do not necessarily include the compound angle configuration whereby the finger planes intersect the engagement plane at the second angle 72 such that, during use, a frictional force is developed which urges the workpiece either sideways against the fence 20 or downwardly against the table 12, depending on the orientation of the featherboard 30 or 32. In other words, the setting gauge 80 is useful in the situation where the finger planes intersect the engagement place at the first angle 70, which may be viewed as a diagonal angle, so that resiliency of the flexible fingers 62 provides a static force which urges the workpiece.

Referring in particular to FIG. 5, in order to maximize the contact area or frictional interface of the distal ends 64 with the workpiece 14, the distal ends 64 of the fingers 62 are beveled such that, when deflected, a flat end surface 90 of each finger 62 engages the workpiece 14. The distal ends 64 of the fingers 62 are cut or molded at such an angle that, after allowing for the predetermined amount of deflection set by the setting gauge 80, the distal ends 64 of the fingers 62 bear fully against their distal ends 64. Thus, the beveling of the ends 64 of the flexible fingers 62 at a particular bevel angle is facilitated by the setting gauge 80 which provides a precise and repeatable adjustment of the featherboards 30 and 32. This bevel also improves the wear characteristics of the fingers 62 by preventing a sharp edge from becoming burnished smooth, and potentially diminishing the effectiveness of the featherboard in providing the frictional or traction force which urges the workpiece 14 sideways against the fence 20 during use when the workpiece 14 is in motion. Moreover, by reducing wear, the beveling of the ends 64 of the flexible fingers 62 tends to maintain the desired setting depth.

It will likewise be appreciated that the beveling of the distal ends 64 to provide a flat end surface 90 can also be employed in combination with featherboards which do not necessarily include the compound angle configuration whereby the finger planes intersect the engagement plane at the second angle 72 such that, during use, a frictional force is developed which urges the workpiece either sideways against the fence 20 or downwardly against the table 12, depending on the orientation of the featherboard 30 or 32, particularly where such featherboards include the setting gauge rabbet 80. The repeatability of the set-up adjustment facilitated by the setting gauge rabbet 80 allows a particular bevel angle to be predetermined.

Figure 6:
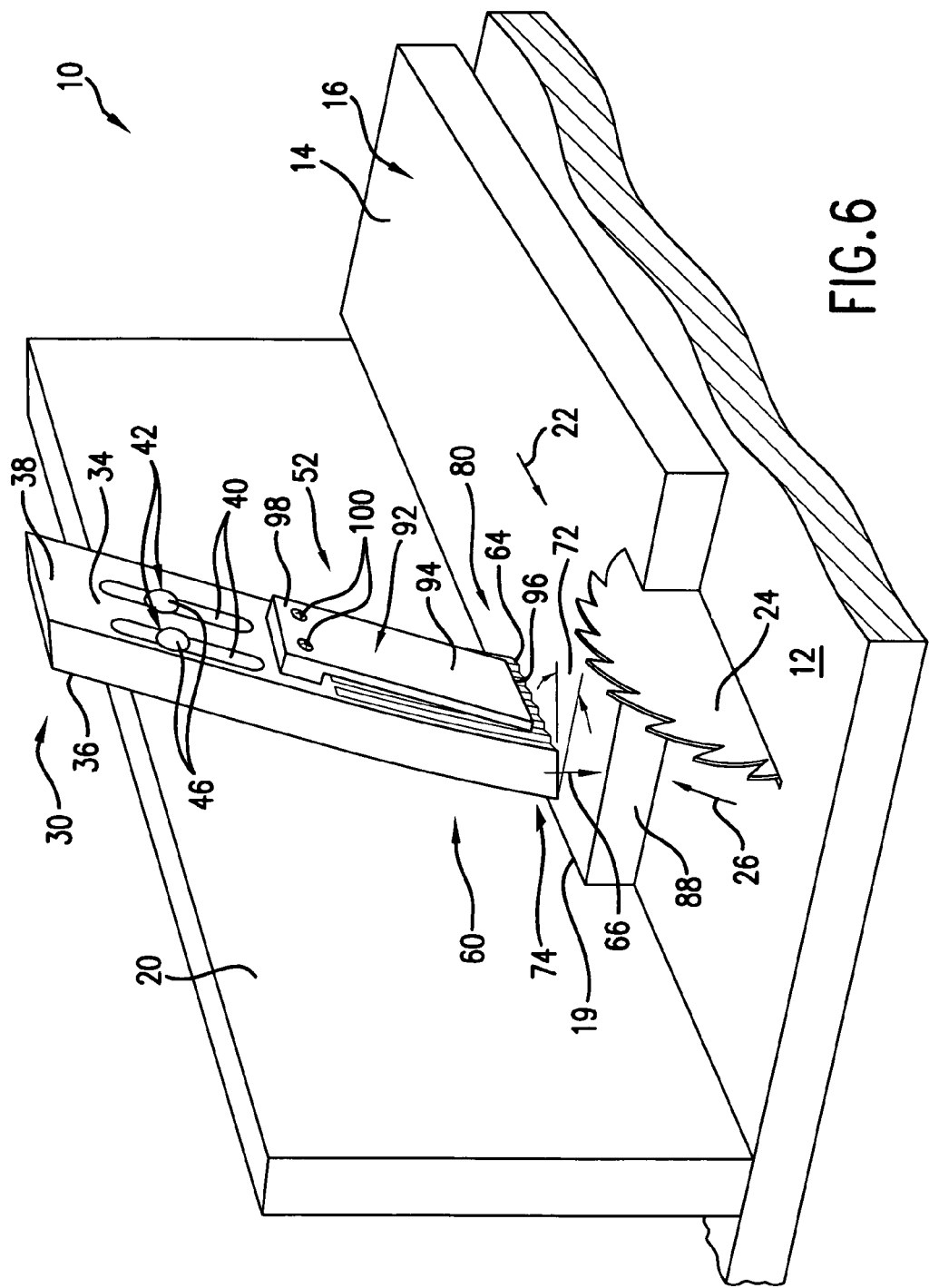
FIG. 6 is a three-dimensional view, in the same orientation of FIGS. 3 and 4, showing an alternative embodiment of a parallel setting gauge.

FIG. 6 depicts an alternative parallel setting gauge 80 embodiment 92. In addition, the parallel setting gauge embodiment 92 of FIG. 6 serves as the protrusion 52 to prevent or at least discourage improper mounting of the featherboard 30 or 32, as an alternative to the rounded protuberance 54. More particularly, the setting gauge 92 includes a gauge element 94 attached to the mounting portion 34 of the featherboard 30 or 32 and extending along the visible front side 38 generally parallel to but spaced from the flexible fingers 62. The spacing away of the gauge element 94 from the flexible fingers 62 accommodates flexing of the fingers 62 as described hereinabove with reference to FIG. 3 in the particular context of the gap 74. The gauge element 92 has an extent less than that of the flexible fingers 62, and terminates in an edge 96 (lower edge 96 in the orientation of FIG. 6) for engagement with the workpiece 14 while the featherboard 30 or 32 mounting is adjusted with the fingers 62 undeflected, in the same manner as is described hereinabove with reference to FIG. 4. Thus, the edge 96 of the gauge element 94 is positioned such that, following adjustment, when the workpiece 14 is fed into engagement with the full width of the fingers 62 during use, the desired amount of finger flexing occurs.

The parallel setting gauge 92 has an end 98 opposite the edge (upper end 98 in the orientation of FIG. 6) which may be viewed as a mounting block 98 and which is thicker than the gauge element 94 so as to achieve the spacing away of the gauge element 94 from the flexible fingers 62. The parallel setting gauge 92 (again, which also serves as the protrusion 52 to prevent or at least discourage improper mounting of the featherboard 30 or 32) is attached to the featherboard by a pair of screws 100. The parallel setting gauge 92 may be slightly adjustable to allow for different contact pressure of the fingers 62 when flexed, and to compensate for wear of the finger 62 ends 64.

It will be appreciated that the parallel setting gauge 80 embodiment 92 of FIG. 6 also may be employed in combination with featherboards which do not necessarily include the compound angle configuration whereby the finger planes intersect the engagement plane at the second angle 72 such that, during use, a frictional force is developed which urges the workpiece either sideways against the fence 20 or downwardly against the table 12, depending on the orientation of the featherboard 30 or 32 (so that resiliency of the flexible fingers 62 provides only the static force which urges the workpiece 14). In that event, it is not necessary for the gauge element 94 to be spaced away from the flexible fingers 62.

FIG. 7 depicts a less common configuration of a table saw 110 including a horizontal table 112, and wherein a fence 120 is to the left of the saw blade 24, when viewed from the front of the table saw 110, in the direction of workpiece 14 travel as indicated by arrow 22. Although not common with table saws, such a configuration is found in other cutting machines, such as shapers (which commonly have a reversible direction of rotation). FIG. 7 is thus essentially a mirror image of FIG. 1, and is a three-dimensional view generally from the right front of the table saw 110, with "left hand" versions of two featherboards 130 and 132 embodying the invention mounted to the fence 120 in a vertical orientation.

The "left hand" version featherboards 130 and 132 embodying the invention are essentially identical to the "right hand" version featherboards 30 and 32 described hereinabove with reference to FIGS. 1-5, but are related in the manner of mirror images. The second angle 72 of the compound angle configuration is such that, during use when the workpiece 14 is moving, the frictional force which is developed includes a component which urges the workpiece 14 in the desired direction, in particular, towards the fence 120. If the "right hand" version featherboards 30 and 32 shown in FIG. 1 were employed with the table saw 110 of FIG. 7, during use when the workpiece 14 is in motion, the workpiece 14 would undesirably be urged away from the fence 120. It is the protrusions 52 which prevent, or at least discourage, such improper mounting.

Figure 8:
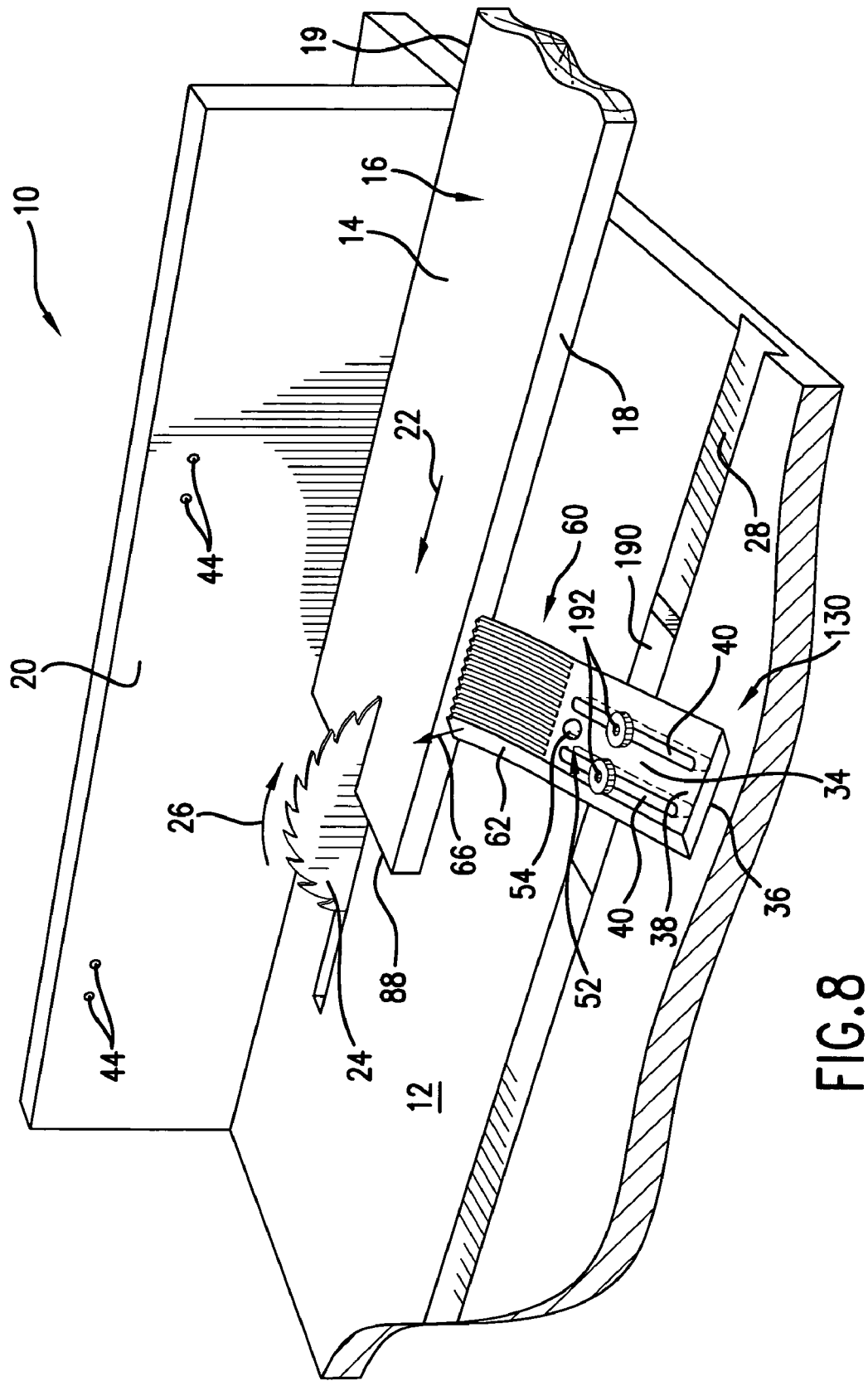
FIG. 8 is a three-dimensional view, generally from the left front of the table saw, with a "left hand" version of a featherboard embodying the invention mounted to the table of the table saw in a horizontal orientation.

With reference to FIG. 8, a "left hand" version featherboard 130 is mounted to the table 12 of the table saw 10 in a horizontal orientation such that the distal ends 64 of the fingers 62 engage the side surface 18 of the workpiece 14. Thus the resiliency of the flexible fingers 62 provides the static force which urges the workpiece 14 sideways against the fence 20, as a result of the finger planes intersecting the engagement plane at the first angle 70, which may be viewed as a diagonal angle. In a manner comparable to that which is described above with reference to FIG. 3 in the context of the vertically-oriented featherboard 30, the intersection of the finger planes with the engagement plane at the second angle 72 causes a frictional or traction force to be developed during use when the workpiece 14 is in motion which force includes a component that urges the workpiece 14 downwardly against the table 12. The horizontal featherboard 130 orientation of FIG. 8 is primarily employed when necessitated in particular circumstances, such as in the event workpiece 14 thickness exceeds the available adjustment range of a vertically-oriented featherboard 30 or 32 as in FIG. 1.

Since the "right hand" featherboards 30 and 32 are not employed in the FIG. 8 configuration, the circular apertures 44 in the fence 20 to facilitate mounting are visible.

In FIG. 8, the featherboard 130 is secured to the table 12 employing a mounting bar 190 which engages the dovetail miter gauge slot 28. A pair of hand-tightenable machine screws 192 with heads visible in FIG. 8 screw into corresponding threaded apertures (not shown) in the mounting bar 190. In the case of a miter gauge slot which is rectangular in cross section, the mounting bar 190 requires an expansion clamp mechanism (not shown). In the case of a miter gauge slot which has an inverted "T" cross section, an arrangement similar to the dovetail slot mounting can be employed. Alternatively, the mounting bar 190 may be dispensed with altogether, and a pair of inverted capscrews (not shown) employed instead. In that case, the heads of the inverted capscrews engage the "T" slot, and the threaded portions (not shown) of the capscrews project upwardly through the longitudinal mounting and adjustment slots 40. Hand-tightenable nuts (not shown) are then employed.

In order for the frictional or traction force to properly urge the workpiece 14 down against the table, in the FIG. 8 configuration a "left hand" version of the featherboard 130 must be employed. In other words, a "right hand" version 30 or 32 functions correctly as a vertically-oriented hold down on a fence to the right of the blade when viewed from the front of the table saw 10 in the direction of workpiece 14 travel, but would only function correctly horizontally with a fence to the left of the blade (as in FIG. 7) when viewed from the front of the table saw 110 in the direction of workpiece 14 travel. Conversely, a "left hand" version 130 or 132 functions correctly as a vertically-oriented hold down on a fence to the left of the saw blade (as in FIG. 7), but only functions correctly horizontally with a fence to the right of the blade (as in FIG. 8). It will be appreciated that these considerations are consistent with the protrusion 52 which prevents or at least discourages improper mounting of a featherboard. Thus, as an example, if a user were to attempt to mount either of the FIG. 1 "right hand" featherboards 30 or 32 horizontally to the table 12, the protrusion 52 would contact the table 12 preventing the featherboard 30 or 32 from lying flat and thereby indicating improper use (unless the user were attempting to point the diagonally-angled fingers 62 towards an oncoming workpiece, which likewise would present an obvious problem with the set up). Similarly, the protrusion 52 effectively ensures that the setting gauge 80 is accessible for use.

While it would be possible to combine a pair of vertically-oriented featherboards 30 and 32 as in FIG. 1, with a horizontally-oriented featherboard 130 as in FIG. 8, such a requirement is generally avoided by the directional characteristics of featherboards embodying the invention.

Figure 9:
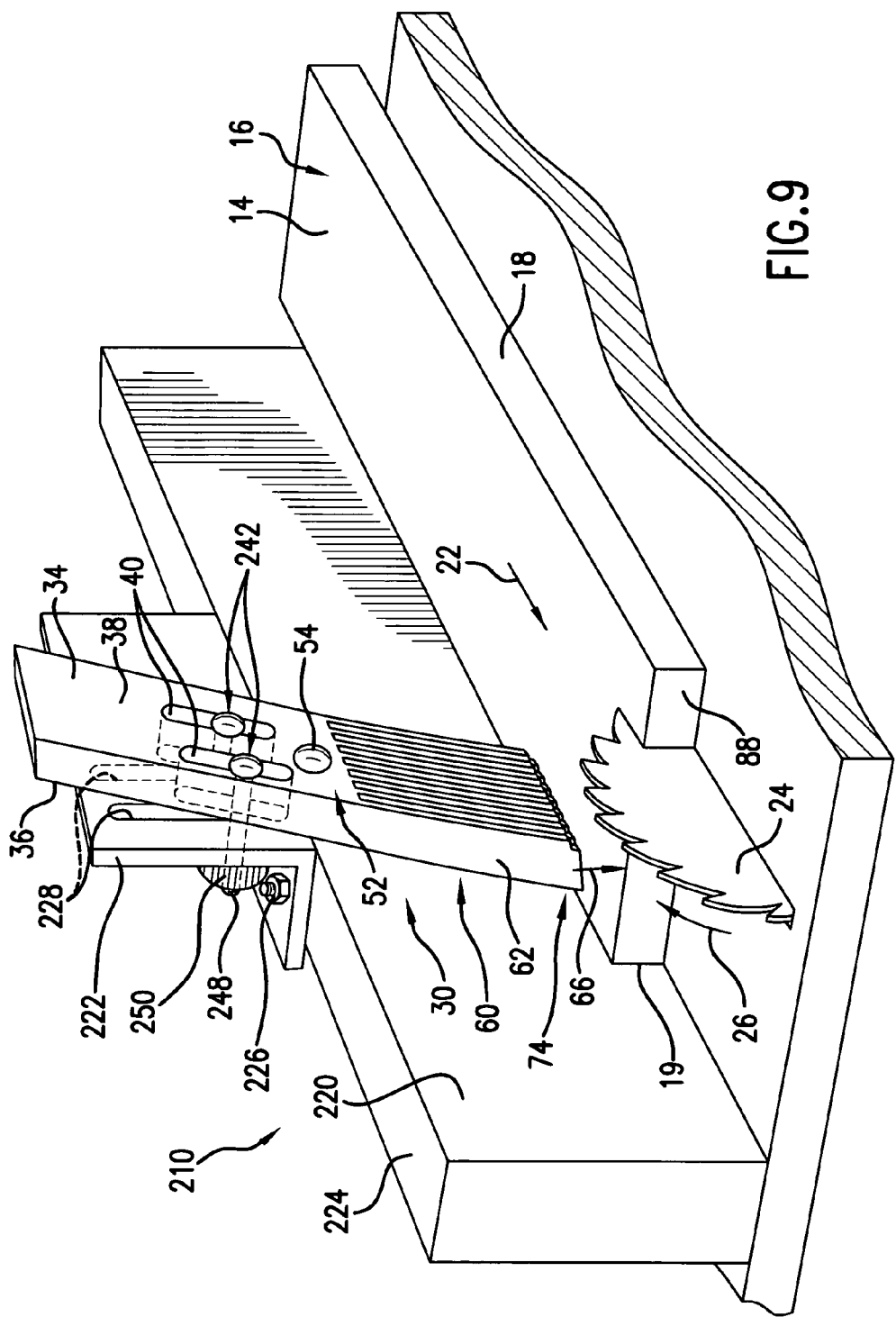
FIG. 9 is an enlarged three-dimensional view of a table saw, generally from the left rear of thereof, showing an alternative mounting of a featherboard.

Referring finally to FIG. 9, which is a view generally from the left rear of a table saw 210, shown is an alternative mounting of the featherboard 30. In FIG. 9, the table saw 210 has a fence 220 which is not as tall as the fence 20 of FIGS. 1-3, and a separate angle bracket 222 is mounted to the top edge 224 of the fence 220 employing fasteners such as the fastener 226, effectively extending the vertical height of the fence 220 where the featherboard 30 is mounted. The bracket 222 has a pair of vertical slots 228 (only one slot 228 of which is visible in FIG. 9), which are employed instead of the featherboard-mounting apertures 44 (FIG. 8) in the fence 20. Carriage bolts 242 are used as in the embodiment of FIGS. 1-3, but are not as long as the carriage bolts 42 (FIGS. 1 and 3). The carriage bolts 242 have threaded ends 248, with hand-tightenable nuts 250 on the threaded ends 248. The slots 228 in the bracket 222 allow for additional height adjustment, beyond what is possible employing only the slots 40 in the featherboard 30 itself. Another variation (not shown) is to only have slots 228 in the bracket 222, and just round mounting apertures in the featherboard 30.

It will be appreciated that the featherboards 30 and 32 may be attached in other ways. Examples are a magnetic attachment (not shown) or a clamping mechanism (not shown).

While particular embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A featherboard for use with a cutting machine having a table which supports a workpiece and a fence extending upwardly from the table, said featherboard serving to urge the workpiece both against the fence and against the table as the workpiece is pushed along the fence in a workpiece travel direction, comprising:

a mounting portion;

a row of flexible fingers extending from said mounting portion, said flexible fingers lying in respective parallel finger planes and having distal ends for engaging the workpiece, said distal ends generally lying in an engagement plane which, during use, is parallel to a featherboard engagement surface of the workpiece, and each of said flexible fingers capable of flexing in a flex direction perpendicular to said finger plane of the respective flexible finger;

the finger planes intersecting the engagement plane at a first angle so that, during use, resiliency of said flexible fingers provides a static force which urges the workpiece downwardly against the table when said featherboard is oriented vertically or sideways against the fence when said featherboard is oriented horizontally; and in a compound angle configuration, the finger planes also intersecting the engagement plane at a second angle such that the flex directions of said flexible fingers are angled with reference to the workpiece travel direction so that, during use, a frictional force is developed which urges the workpiece sideways against the fence when said featherboard is oriented vertically or downwardly against the table when said featherboard is oriented horizontally.

2. The featherboard of claim 1, having a rear side, which, during use, is against the fence when said featherboard is oriented vertically or against the table when said featherboard is oriented horizontally, and a spaced apart front side which, during use, is generally visible, said flexible fingers extending widthwise between said front and rear sides, and said mounting portion of said featherboard including a protrusion on said front side to discourage improper mounting of said featherboard with said front side against the fence when said featherboard is oriented vertically or against the table when said featherboard is oriented horizontally, which improper mounting would, during use, undesirably cause a frictional force to be developed which would urge the workpiece sideways away from the fence when said featherboard is oriented vertically or upwardly away from the table when said featherboard is oriented horizontally.

3. The featherboard of claim 1, wherein the second angle is such that the flex directions of said flexible fingers are angled with reference to the workpiece travel direction so that, during use, a frictional force is developed which urges the workpiece sideways against the fence when said featherboard is oriented vertically and the fence is to the right of said featherboard with reference to the workpiece travel direction.

4. The featherboard of claim 1, wherein the second angle is such that the flex directions of said flexible fingers are angled with reference to the workpiece travel direction so that, during use, a frictional force is developed which urges the workpiece sideways against the fence when said featherboard is oriented vertically and the fence is to the left of said featherboard with reference to the workpiece travel direction.

5. The featherboard of claim 3, having a rear side, which, during use, is against the fence when said featherboard is oriented vertically or against the table when said featherboard is oriented horizontally, and a spaced apart front side which, during use, is generally visible, said flexible fingers extending widthwise between said front and rear sides, and said mounting portion of said featherboard including a protrusion on said front side to discourage improper mounting of said featherboard with said front side against the fence when said featherboard is oriented vertically or against the table when said featherboard is oriented horizontally, which improper mounting would, during use, undesirably cause a frictional force to be developed which would urge the workpiece sideways away from the fence when said featherboard is oriented vertically or upwardly away from the table when said featherboard is oriented horizontally.

6. The featherboard of claim 4, having a rear side, which, during use, is against the fence when said featherboard is oriented vertically or against the table when said featherboard is oriented horizontally, and a spaced apart front side which, during use, is generally visible, said flexible fingers extending widthwise between said front and rear sides, and said mounting portion of said featherboard including a protrusion on said front side to discourage improper mounting of said featherboard with said front side against the fence when said featherboard is oriented vertically or against the table when said featherboard is oriented horizontally, which improper mounting would, during use, undesirably cause a frictional force to be developed which would urge the workpiece sideways away from the fence when said featherboard is oriented vertically or upwardly away from the table when said featherboard is oriented horizontally.

7. The featherboard of claim 1, having a rear side, which, during use, is against the fence when said featherboard is oriented vertically or against the table when said featherboard is oriented horizontally, and a spaced apart front side which, during use, is generally visible, said flexible fingers extending widthwise between said front and rear sides;

said featherboard further comprising a parallel setting gauge to facilitate adjustment of said featherboard such that, when the workpiece is not engaged and said fingers are undeflected, said distal ends lie in a finger end plane which is parallel to the table when said featherboard is oriented vertically or parallel to the fence when said featherboard is oriented horizontally, and which finger end plane is spaced a desired distance from the table when said featherboard is oriented vertically or a desired distance from the fence when said featherboard is oriented horizontally so that each finger is flexed by a desired amount as the workpiece is fed into engagement with said flexible fingers.

8. The featherboard of claim 7, wherein said parallel setting gauge comprises a rabbet formed in the distal end of each of said flexible fingers adjacent said front side for engagement with the workpiece while said featherboard mounting is adjusted with said fingers undeflected, said rabbets having a depth such that, following adjustment, when the workpiece is fed into engagement with the full width of the fingers during use the desired amount of finger flexing occurs.

9. The featherboard of claim 7, wherein said parallel setting gauge comprises a gauge element attached to said mounting portion and extending along said front side generally parallel to but spaced from said flexible fingers, said gauge element having an extent less than that of said flexible fingers and terminating in an edge for engagement with the workpiece while said featherboard mounting is adjusted with said fingers undeflected, said edge of said gauge element positioned such that, following adjustment, when the workpiece is fed into engagement with the full width of the fingers during use the desired amount of finger flexing occurs.

10. The featherboard of claim 1, wherein said distal ends of said flexible fingers are beveled such that, when deflected, a flat end surface of each finger engages the workpiece.

11. The featherboard of claim 7, wherein said distal ends of said flexible fingers are beveled such that, when deflected, a flat end surface of each finger engages the workpiece.

12. The featherboard of claim 8, wherein said distal ends of said flexible fingers are beveled such that, when deflected, a flat end surface of each finger engages the workpiece.

13. The featherboard of claim 9, wherein said distal ends of said flexible fingers are beveled such that, when deflected, a flat end surface of each finger engages the workpiece.

14. A featherboard for use with a cutting machine having a table which supports a workpiece and a fence extending upwardly from the table, said featherboard having a rear side, which, during use, is against the fence when said featherboard is oriented vertically or against the table when said featherboard is oriented horizontally, and a spaced apart front side which, during use, is generally visible, said featherboard serving to urge the workpiece at least against the table when said featherboard is oriented vertically or against the fence when said featherboard is oriented horizontally as the workpiece is pushed along the fence, comprising:

a mounting portion;

a row of flexible fingers extending from said mounting portion, said flexible fingers lying in respective parallel finger planes and having distal ends for engaging the workpiece, said flexible fingers extending widthwise between said front and rear sides, said distal ends generally lying in an engagement plane which, during use, is parallel to a featherboard engagement surface of the workpiece, and each of said flexible fingers capable of flexing in a flex direction perpendicular to said finger plane of the respective flexible finger, the finger planes intersecting the engagement plane at an angle so that, during use, resiliency of said flexible fingers provides a static force which urges the workpiece downwardly against the table when said featherboard is oriented vertically or sideways against the fence when said featherboard is oriented horizontally; and a parallel setting gauge to facilitate adjustment of said featherboard such that, when the workpiece is not engaged and said fingers are undeflected, said distal ends lie in a finger end plane which is parallel to the table when said featherboard is oriented vertically or parallel to the fence when said featherboard is oriented horizontally, and which finger end plane is spaced a desired distance from the table when said featherboard is oriented vertically or a desired distance from the fence when said featherboard is oriented horizontally so that each finger is flexed by a desired amount as the workpiece is fed into full engagement with said flexible fingers.

15. The featherboard of claim 14, wherein said parallel setting gauge comprises a rabbet formed in the distal end of each of said flexible fingers adjacent said front side for engagement with the workpiece while said featherboard mounting is adjusted with said fingers undeflected, said rabbets having a depth such that, following adjustment, when the workpiece is fed into engagement with the full width of the fingers during use the desired amount of finger flexing occurs.

16. The featherboard of claim 14, wherein said parallel setting gauge comprises a gauge element attached to said mounting portion and extending along said front side generally parallel to said flexible fingers, said gauge element having an extent less than that of said flexible fingers and terminating in an edge for engagement with the workpiece while said featherboard mounting is adjusted with said fingers undeflected, said edge of said gauge element positioned such that, following adjustment, when the workpiece is fed into engagement with the full width of the fingers during use the desired amount of finger flexing occurs.

17. The featherboard of claim 14, wherein said distal ends of said flexible fingers are beveled such that, when deflected, a flat end surface of each finger engages the workpiece.

18. The featherboard of claim 15, wherein said distal ends of said flexible fingers are beveled such that, when deflected, a flat end surface of each finger engages the workpiece.

19. The featherboard of claim 16, wherein said distal ends of said flexible fingers are beveled such that, when deflected, a flat end surface of each finger engages the workpiece.

20. A featherboard for use with a cutting machine having a table which supports a workpiece and a fence extending upwardly from the table, said featherboard serving to urge the workpiece at least against the table when said featherboard is oriented vertically or against the fence when said featherboard is oriented horizontally as the workpiece is pushed along the fence, comprising:

a mounting portion; and a row of flexible fingers extending from said mounting portion, said flexible fingers lying in respective parallel finger planes and having distal ends for engaging the workpiece, said distal ends generally lying in an engagement plane which, during use, is parallel to a featherboard engagement surface of the workpiece, and each of said flexible fingers capable of flexing in a flex direction perpendicular to said finger plane of the respective flexible finger, the finger planes intersecting the engagement plane at an angle so that, during use, resiliency of said flexible fingers provides a static force which urges the workpiece downwardly against the table when said featherboard is oriented vertically or sideways against the fence when said featherboard is oriented horizontally, and said distal ends of said flexible fingers being beveled such that, when deflected, a flat end surface of each finger engages the workpiece.

* * * * *